(12) United States Patent
Schmalholz et al.

(10) Patent No.: US 8,996,221 B2
(45) Date of Patent: Mar. 31, 2015

(54) METHOD FOR TRACTION CONTROL IN A MOTOR VEHICLE, AND CONTROL SYSTEM FOR CARRYING OUT THE METHOD

(71) Applicants: Dr. Ing. h.c. F. Porsche Aktiengesellschaft, Stuttgart (DE); Robert Bosch GmbH, Stuttgart (DE)

(72) Inventors: Markus Schmalholz, Stuttgart (DE); Andreas Erban, Loechgau (DE)

(73) Assignees: Dr. Ing. h.c. F. Porsche Aktiengesellschaft (DE); Robert Bosch GmbH (DE)

( * ) Notice: Subject to any disclaimer, the term of this patent is extended or adjusted under 35 U.S.C. 154(b) by 0 days.

(21) Appl. No.: 14/248,543

(22) Filed: Apr. 9, 2014

(65) Prior Publication Data

US 2014/0309825 A1 Oct. 16, 2014

(30) Foreign Application Priority Data

Apr. 11, 2013 (DE) .......................... 10 2013 206 379

(51) Int. Cl.
*B60L 3/10* (2006.01)

(52) U.S. Cl.
CPC ........................................ *B60L 3/10* (2013.01)
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 6,829,529 B2* | 12/2004 | Trefzer et al. .................. | 701/82 |
| 8,527,177 B2* | 9/2013 | Linda et al. ..................... | 701/74 |
| 2003/0167116 A1* | 9/2003 | Erban .............................. | 701/74 |
| 2003/0216850 A1* | 11/2003 | Trefzer et al. .................. | 701/82 |
| 2010/0256887 A1* | 10/2010 | Linda et al. ..................... | 701/82 |
| 2010/0286858 A1 | 11/2010 | Otokawa | |

FOREIGN PATENT DOCUMENTS

| | | |
|---|---|---|
| DE | 10 2011 100 811 | 11/2012 |
| DE | 10 2011 100 814 | 11/2012 |

OTHER PUBLICATIONS

German Search Report of Dec. 3, 2013.

* cited by examiner

*Primary Examiner* — Thomas Tarcza
*Assistant Examiner* — Alex C Dunn
(74) *Attorney, Agent, or Firm* — Gerald E. Hespos; Michael J. Porco; Matthew T. Hespos

(57) ABSTRACT

A motor vehicle has a drive unit with at least one electric machine (14, 15) and a control system for traction control. The control system has an ESP control unit (18) that determines a setpoint slip in a manner dependent on the driving situation for each driven axle (10, 11) or each driven wheel (12, 13), and controls the drive unit in a manner dependent on the setpoint slip. The ESP control unit (18) determines a motor setpoint rotational speed for the respective electric machine (14, 15) in a manner dependent on the setpoint slip. An electronic power system (21, 22) of the respective electric machine (14, 15) controls operation of the respective electric machine (14, 15) based on the respective motor setpoint rotational speed.

8 Claims, 1 Drawing Sheet

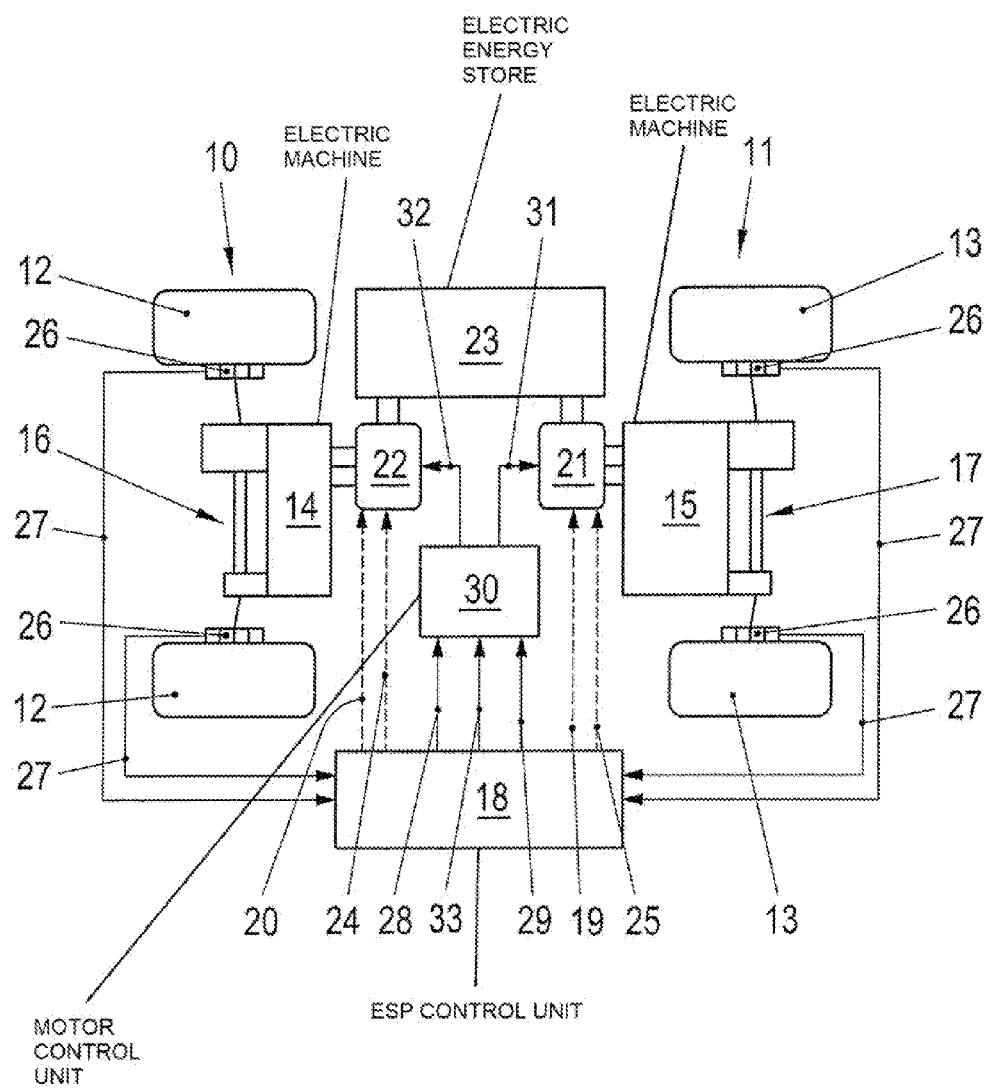

METHOD FOR TRACTION CONTROL IN A MOTOR VEHICLE, AND CONTROL SYSTEM FOR CARRYING OUT THE METHOD

CROSS REFERENCE TO RELATED APPLICATION

This application claims priority under 35 USC 119 to German Patent Appl. No. 10 2013 206 379.2 filed on Apr. 11, 2013, the entire disclosure of which is incorporated herein by reference.

BACKGROUND

1. Field of the Invention

The invention relates to a method for traction control in a motor vehicle in accordance and to a control system for carrying out the method.

2. Description of the Related Art

Traction control at driven wheels or axles of a motor vehicle is well known. Thus, a wheel slip is understood to mean the ratio of the speed of a wheel center point of the wheel to the circumferential speed of the wheel. There is no slip when the wheel center point speed of the wheel corresponds to the circumferential speed of the wheel.

Drive traction control refers to carrying out traction control in the traction mode of the motor vehicle.

Motor overrun control refers to carrying out traction control in the overrun mode or braking mode of the motor vehicle.

Traction control uses an ESP control unit to determine a setpoint slip that is dependent on the driving situation for the driven axles or the driven wheels of the motor vehicle in a manner that is dependent on the current driving situation, and determines a setpoint circumferential speed for the driven wheels from the setpoint slip.

The setpoint circumferential speed for the wheels is compared in the ESP control unit with an actual circumferential speed that has been detected using measuring technology, in order thus to influence the drive moment of the drive unit of the motor vehicle on the basis of a control deviation between the actual slip and the setpoint slip. For this purpose, the ESP control unit determines permissible limit values for the drive moment of the drive unit and provides the limit values to a motor control unit. The motor control unit limits a driver-side desired drive moment on the basis of the limit values.

Traction control that controls the drive moment of the drive unit in a manner that is dependent on the control deviation between the setpoint slip and the actual slip is suitable for motor vehicles that have an internal combustion engine as the drive unit. Hybrid vehicles and pure electric vehicles have a drive unit that comprises at least one electric machine. The control of the drive moment on the basis of the control deviation between the setpoint slip and the actual slip is disadvantageous in vehicles that have a drive unit with at least one electric machine. More particularly, the drive moment in electric machines is very dynamic in comparison with internal combustion engines, and, as a result, oscillations disadvantageously can be caused in the traction control.

US 2010/0286858 discloses a control system for a hybrid vehicle, in which traction control takes place by way of influencing the drive moment of the electric machine of the hybrid drive.

It is an object of the invention to provide an improved method for traction control in a motor vehicle and a control system for carrying out the method.

SUMMARY OF THE INVENTION

According to the invention, a motor setpoint rotational speed for the respective electric machine of the drive unit is determined in a manner that is dependent on the setpoint slip, which is dependent on the driving situation for each axle driven by an electric machine of the drive unit or for each wheel driven by an electric machine of the drive unit. The operation of the respective electric machine of the drive unit is controlled on the basis of the respective motor setpoint rotational speed.

The invention determines a motor setpoint rotational speed for the respective electric machine of the drive unit in a manner that is dependent on the setpoint slip, which is dependent on the driving situation. The invention then controls the rotational speed of the respective electric machine on the basis of the motor setpoint rotational speed. Accordingly, a less dynamic signal is used for traction control, as a result of which the susceptibility to oscillations of the traction control is reduced.

The determination of the motor setpoint rotational speed for the respective electric machine preferably is carried out in an ESP control unit. The motor setpoint rotational speed for the respective electric machine is provided by the ESP control unit to an electronic power system of the respective electric machine. The electronic power system controls the rotational speed of the respective electric machine on the basis of the respective motor setpoint rotational speed.

Signal transit times for the control of the respective electric machine via a data bus of the motor vehicle can be eliminated as far as possible when the determination of the respective motor setpoint rotational speed takes place in the ESP control unit and the actual control of the rotational speed on the basis of the motor setpoint rotational speed takes place in the electronic power system of the respective electric machine. As a result, the control quality of the traction control can be increased further.

In first operating situations of the motor vehicle, the motor setpoint rotational speed for the respective electric machine of the drive unit is determined in a manner that is dependent on the setpoint slip, which is dependent on the driving situation for each axle driven by an electric machine of the drive unit or for each wheel driven by an electric machine of the drive unit. The rotational speed of the respective electric machine of the drive unit then is controlled on the basis of the respective motor setpoint rotational speed. However, in second operating situations of the motor vehicle, a setpoint circumferential speed is determined in a manner that is dependent on the setpoint slip, which is dependent on the driving situation for each axle driven by an electric machine of the drive unit or for each wheel driven by an electric machine of the drive unit. The setpoint circumferential speed is compared with an actual circumferential speed to control a drive moment of the respective electric machine in a manner that is dependent on a control deviation between the setpoint slip and an actual slip. The traction control that is dependent on the operating situation is particularly advantageous.

Exemplary embodiments of the invention will be explained in greater detail using the drawing.

BRIEF DESCRIPTION OF THE DRAWING

FIG. 1 is a diagrammatic view of a control system for traction control in a motor vehicle.

DETAILED DESCRIPTION OF THE PREFERRED EMBODIMENTS

The invention relates to a method for traction control in a motor vehicle and to a control system for carrying out the method. In the following text, the invention will be described in detail with reference to the drive diagram of FIG. 1. FIG. 1 shows a drive diagram of a pure electric vehicle.

The electric vehicle of FIG. 1 has two driven axles 10, 11, each of which has two driven wheels 12 and 13. Each of the two driven axles 10, 11 is assigned an electric machine 14 and 15 of a drive unit of the electric vehicle. The electric machine 14 drives the wheels 12 of the axle 10 via a differential 16 and the electric machine 15 drives the wheels 13 of the axle 11 via a differential 17.

FIG. 1 also shows an ESP control unit 18. The ESP control unit 18 determines a setpoint slip in a manner dependent on a currently prevailing driving situation for each driven axle 10, 11 or each driven wheel 12, 13 of the motor vehicle.

The traction control takes place on the basis of the setpoint slip. More particularly, the operation of the electric machine 14 and 15 in FIG. 1 is carried out on the basis of the setpoint slip, which is dependent on the driving situation and is determined in the ESP control unit 18.

In at least some operating situations of the motor vehicle, a motor setpoint rotational speed for the respective electric machine 14, 15 is determined in a manner that is dependent on the setpoint slip, which, in turn, is dependent on the driving situation for each of the two electric machines 14, 15 of the drive unit that drive the axles 10, 11 or wheels 12, 13. The rotational speed of the respective electric machine 14, 15 is controlled on the basis of the respective motor setpoint rotational speed. The determination of the motor setpoint rotational speed for the respective electric machine 14, 15 takes place in a manner that is dependent on: the setpoint slip, which is dependent on the driving situation; the wheel radius; and the transmission ratio of the drive train. The transmission ratio is determined substantially by the gear mechanisms 16, 17.

The determination of the motor setpoint rotational speeds for the electric machines 14, 15 takes place in the ESP control unit 18 in a manner that is dependent on the setpoint slip, which is dependent on the driving situation. The ESP control unit 18 outputs the motor setpoint rotational speeds as output data 19, 20 and transmits those data to an electronic power system 21 and 22 of the respective electric machine 14 and 15. The electronic power system 22 controls the rotational speed of the electric machine 14 on the basis of the corresponding motor setpoint rotational speed 20, and the electronic power system 21 controls the rotational speed of the electric machine 15 on the basis of the corresponding motor setpoint rotational speed 19.

According to FIG. 1, the two electronic power systems 21 and 22 interact with an electric energy store 23 that provides electric power for operating the electric machines 14, 15.

Accordingly, in at least some operating situations of the motor vehicle, a motor setpoint rotational speed is determined in a manner that is dependent on a setpoint slip, which is dependent on the driving situation and is determined in the ESP control unit 18 for each electric machine 14, 15 that drives the respective axle. The electronic power systems 21, 22 of the respective electric machines 14, 15 control the rotational speed on the basis of said motor setpoint rotational speed. The setpoint value formation then takes place in the ESP control unit 18 and the actual control takes place in the electronic power systems 21, 22.

In a first variant of the invention, the traction control takes place via the rotational speed control of the electric machine 14, 15 in all operating situations of the motor vehicle. In a second refinement of the invention, the traction control takes place via the rotational speed control of the electric machine 14, 15 only in first operating situations of the motor vehicle, as detected by the ESP control unit 18. The ESP control unit 18 then transmits a requirement bit as further output variables 24, 25 to the electronic power systems 21, 22 when the ESP control unit 18 detects that a first operating situation of this type exists. As a result, the electronic power systems 21, 22 perform traction control of the respective electric machine 14, 15 based on the motor setpoint rotational speeds 19, 20.

In second operating situations, the traction control takes place so that the ESP control unit 18 determines a setpoint circumferential speed in a manner that is dependent on the setpoint slip, which is dependent on the driving situation for each axle 10, 11 driven by the electric machines 14, 15 or for each driven wheel 12, 13. The ESP control unit 18 compares this setpoint circumferential speed with actual circumferential speeds of the wheels or axles measured by corresponding wheel sensors 26. The actual circumferential speeds of the wheels or axles are provided as input data 27 to the ESP control unit 18. In the second operating situations, the ESP control unit then determines drive moment limit values for the electric machines 14, 15 on the basis of a control deviation between the setpoint slip, which is dependent on the driving situation, and the actual slip, which is detected using measuring technology. The ESP control unit 18 outputs the drive moment limit values as output variables 28, 29 and provides these output variables 28, 29 to a motor control unit 30 of the motor vehicle. In the second operating situations, the motor control unit 30 controls the electric machines 14 and 15 in a manner that is dependent on a driver-side desired drive moment and in a manner that is dependent on the drive moment limit values 28 and 29. The motor control unit 30 outputs actuating variables 31, 32 for the electronic power systems 21, 22 of the electric machines 14, 15. The setpoint value formation then takes place in the ESP control unit 18 and the actual control takes place in the motor control unit 30.

The ESP control unit 18 transmits a corresponding requirement bit as a further output variable 33 to the motor control unit 30 when the traction control is to take place via the drive moments, that is to say when the second operating situations exist.

The above-described traction control can take place both as drive traction control in the traction mode and as motor overrun control in the overrun mode of the motor vehicle. In the overrun mode or braking mode of the motor vehicle, each electric machine is operated as a generator during motor overrun control to charge the electric energy store 23 in a recuperation mode.

What is claimed is:

1. A method for drive traction control in a motor vehicle in a traction mode and/or for motor overrun control in an overrun mode, the motor vehicle having a drive unit with at least one electric machine, a setpoint slip being determined in a manner that is dependent on the driving situation for each driven axle of the motor vehicle or for each driven wheel of the motor vehicle, and the operation of the drive unit being controlled in a manner that is dependent on a setpoint slip, which is dependent on the driving situation, the method comprising determining a motor setpoint rotational speed for the respective electric machine of the drive unit in a manner that is dependent on the setpoint slip, which is dependent on a driving situation for each axle driven by the electric machine of the drive unit or for each wheel driven by an electric machine of the drive unit, and controlling operation of the respective electric machine of the drive unit on the basis of the respective motor setpoint rotational speed.

2. The method of claim 1, wherein the motor setpoint rotational speed for the respective electric machine is determined in a manner that is dependent on: the setpoint slip, which is a function of the driving situation; the wheel radius; and a transmission ratio of the drive train.

3. The method of claim 1, further comprising using an ESP control unit to determine the motor setpoint rotational speed for the respective electric machine.

4. The method of claim 3, further comprising transmitting the motor setpoint rotational speed for the respective electric machine from the ESP control unit to an electronic power system of the respective electric machine, and using the electronic power system to control the rotational speed of the respective electric machine based on the respective motor setpoint rotational speed.

5. The method of claim 4, wherein: in first operating situations of the motor vehicle, the method further comprises determining the motor setpoint rotational speed for the respective electric machine of the drive unit in a manner dependent on the setpoint slip, which is dependent on the driving situation for each axle driven by an electric machine of the drive unit or for each wheel driven by an electric machine of the drive unit, and controlling the rotational speed of the respective electric machine of the drive unit based on the respective motor setpoint rotational speed; and, in second operating situations of the motor vehicle, the method further comprises determining a setpoint circumferential speed in a manner that is dependent on the setpoint slip, which is dependent on the driving situation for each axle driven by an electric machine of the drive unit or for each wheel which is driven by an electric machine of the drive unit, and comparing the setpoint circumferential speed with an actual circumferential speed to control a drive moment of the respective electric machine in a manner that is dependent on a control deviation between the setpoint slip and an actual slip.

6. A control system for a motor vehicle that has a drive unit with at least one electric machine, the control system carrying out drive traction control in a traction mode of the motor vehicle and/or carrying out motor overrun control in the overrun mode of the motor vehicle, the control system comprising:

an ESP control unit that determines a setpoint slip in a manner that is dependent on a driving situation for each driven axle of the motor vehicle or each driven wheel of the motor vehicle and controls operation of the drive unit in a manner that is dependent on the setpoint slip, the ESP control unit further being configured to determine a motor setpoint rotational speed for the respective electric machine of the drive unit in a manner that is dependent on the setpoint slip which is dependent on the driving situation for each axle driven by the electric machine of the drive unit or for each wheel driven by the electric machine of the drive unit; and an electronic power system associated with the respective electric machine and controlling operation of the respective electric machine based on the respective motor setpoint rotational speed.

7. The control system of claim 6, wherein the ESP control unit determines the motor setpoint rotational speed for the respective electric machine in a manner that is dependent on:
the setpoint slip;
the wheel radius; and
a transmission ratio of the drive train.

8. The control system claim 6, wherein the ESP control system is configured so that:

in first operating situations of the motor vehicle, the ESP control unit determines the motor setpoint rotational speed for the respective electric machine of the drive unit in a manner that is dependent on the setpoint slip, which is dependent on the driving situation for each axle driven by an electric machine of the drive unit or for each wheel driven by an electric machine of the drive unit, and the electronic power system of the respective electric machine is configured to control the rotational speed of the respective electric machine of the drive unit based on the respective motor setpoint rotational speed; and in second operating situations of the motor vehicle, the ESP control unit determines a setpoint circumferential speed in a manner that is dependent on the setpoint slip, which is dependent on the driving situation for each axle driven by an electric machine of the drive unit or for each wheel driven by an electric machine of the drive unit, and compares the setpoint circumferential speed with an actual circumferential speed, and a motor control unit controlling a drive moment of the respective electric machine in a manner that is dependent on a control deviation between the setpoint slip and an actual slip.

\* \* \* \* \*